United States Patent
Takahashi et al.

(10) Patent No.: US 10,859,482 B2
(45) Date of Patent: Dec. 8, 2020

(54) ORGANIC RESIDUE INSPECTING METHOD AND LIQUID DISCHARGE HEAD PRODUCING METHOD

(71) Applicant: CANON KABUSHIKI KAISHA, Tokyo (JP)

(72) Inventors: Hyou Takahashi, Fukushima (JP); Yohei Hamade, Tokyo (JP); Ken Ikegame, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 15/818,598

(22) Filed: Nov. 20, 2017

(65) Prior Publication Data

US 2018/0149572 A1 May 31, 2018

(30) Foreign Application Priority Data

Nov. 28, 2016 (JP) .................. 2016-230100

(51) Int. Cl.
*G01N 13/02* (2006.01)
*B41J 2/16* (2006.01)

(52) U.S. Cl.
CPC ............ *G01N 13/02* (2013.01); *B41J 2/16* (2013.01); *B41J 2/1603* (2013.01); *B41J 2/1629* (2013.01); *B41J 2/1631* (2013.01); *B41J 2/1639* (2013.01); *B41J 2/1645* (2013.01); *G01N 2013/0208* (2013.01)

(58) Field of Classification Search
None
See application file for complete search history.

(56) References Cited

U.S. PATENT DOCUMENTS

2010/0212410 A1* 8/2010 Hilliard, Jr. .............. G01N 5/02
73/74
2017/0307536 A1* 10/2017 Dillingham ........ G01N 21/8507

FOREIGN PATENT DOCUMENTS

| CN | 105467578 A | * | 4/2016 |
| JP | 07294513 A | * | 11/1995 |
| JP | 3011853 B2 | | 2/2000 |
| JP | 2007-518587 A | | 7/2007 |
| JP | 5591361 B2 | | 9/2014 |

* cited by examiner

*Primary Examiner* — Cachet I Proctor
(74) *Attorney, Agent, or Firm* — Canon U.S.A., Inc. IP Division

(57) ABSTRACT

A method of detecting an organic residue is provided. The method comprises a step of bringing a liquid A into contact with a surface of a base material; a step of measuring the contact angle (i) of a liquid B on the surface with which the liquid A came into contact; a step of heating and drying the base material; a step of measuring the contact angle (ii) of the liquid B on the dried surface; and a step of comparing the contact angle (i) with the contact angle (ii).

17 Claims, 4 Drawing Sheets

ORGANIC RESIDUE INSPECTING METHOD AND LIQUID DISCHARGE HEAD PRODUCING METHOD

BACKGROUND OF THE INVENTION

Field of the Invention

The present disclosure relates to a method of detecting an organic residue on a surface of a base material and a method of producing a liquid discharge head.

Description of the Related Art

In order that a liquid discharge head, such as inkjet recording head, performs satisfactory liquid discharge, the characteristics of the surface near a discharge port are important. For example, if a liquid remains near a discharge port, the flying direction of liquid droplets may be deflected or the discharging speed of liquid droplets may decrease. Accordingly, as a method of discharging a liquid with high accuracy by solving these problems, liquid repellency treatment on the periphery of the discharge port portion is known. Incidentally, in a process of producing a liquid discharge head, any organic residue may remain on the surface near the discharge port subjected to the liquid repellency treatment, or an organic substance may adhere to the surface during the process. If the organic substance is present on the surface near a discharge port, a desired liquid repellent property is not achieved, and good liquid discharge is not performed. Furthermore, the organic substance may highly affect the liquid repellent property, even if the size is minute or the amount is very low such that the detection with, for example, a metallurgical microscope is difficult. In such a case, the detection of the organic substance is difficult. The organic residue is detected by measuring the contact angle in some cases, but the detection is difficult when the size is minute or the amount is low.

As a method of detecting an organic substance that is difficult to be detected, for example, with a metallurgical microscope or by contact angle measurement, a method of precipitating crystals by chemical reaction with an acid or an alkali on a glass substrate during a process of producing a flat display is known as disclosed in, for example, Japanese Patent No. 3011853. In addition, scanning electron microscopy (SEM) is also a high-resolution detection method and is generally used.

SUMMARY OF THE INVENTION

The present disclosure provides a method of detecting an organic residue on a liquid repellent surface non-destructively and with high sensitivity.

The present disclosure provides a method of detecting an organic residue on a base material, including a step of bringing a liquid A into contact with a surface of a base material; a step of measuring the contact angle (i) of a liquid B on the surface with which the liquid A came into contact; a step of heating and drying the base material; a step of measuring the contact angle (ii) of the liquid B on the dried surface; and a step of comparing the contact angle (i) with the contact angle (ii).

The present disclosure provides a method of producing a liquid discharge head including a substrate and a discharge port-forming member formed on the substrate and having liquid discharge ports. The method of producing a liquid discharge head includes a step of forming a resin layer on a substrate; a step of forming discharge ports on the surface of the resin layer; a step of forming a protective film containing an organic substance so as to cover the resin layer provided with the discharge ports; a step of bringing a liquid A into contact with the protective film to remove the protective film; a step of measuring the contact angle (i) of a liquid B on the surface of the resin layer with which the liquid A came into contact; a step of heating and drying the substrate; a step of measuring the contact angle (ii) of the liquid B on the dried surface of the resin layer; and a step of comparing the contact angle (i) with the contact angle (ii).

The present disclosure provides a method of producing a liquid discharge head including a substrate and a discharge port-forming member formed on the substrate and having liquid discharge ports and a liquid flow channel communicating with the discharge ports. The method of producing a liquid discharge head includes a step of forming a mold material for a flow channel containing an organic substance A on a substrate; a step of forming a resin layer on the substrate and the mold material; a step of forming discharge ports on the surface of the resin layer; a step of forming a protective film containing an organic substance B so as to cover the resin layer provided with the discharge ports; a step of bringing a liquid A1 into contact with the protective film to remove the protective film; a step of bringing a liquid A2 into contact with the mold material to remove the mold material; a step of measuring the contact angle (i) of a liquid B on the surface of the resin layer with which the liquid A2 came into contact; a step of heating and drying the substrate; a step of measuring the contact angle (ii) of the liquid B on the dried surface of the resin layer; and a step of comparing the contact angle (i) with the contact angle (ii).

Further features of the present disclosure will become apparent from the following description of exemplary embodiments with reference to the attached drawings.

DESCRIPTION OF THE EMBODIMENTS

Figure 1:
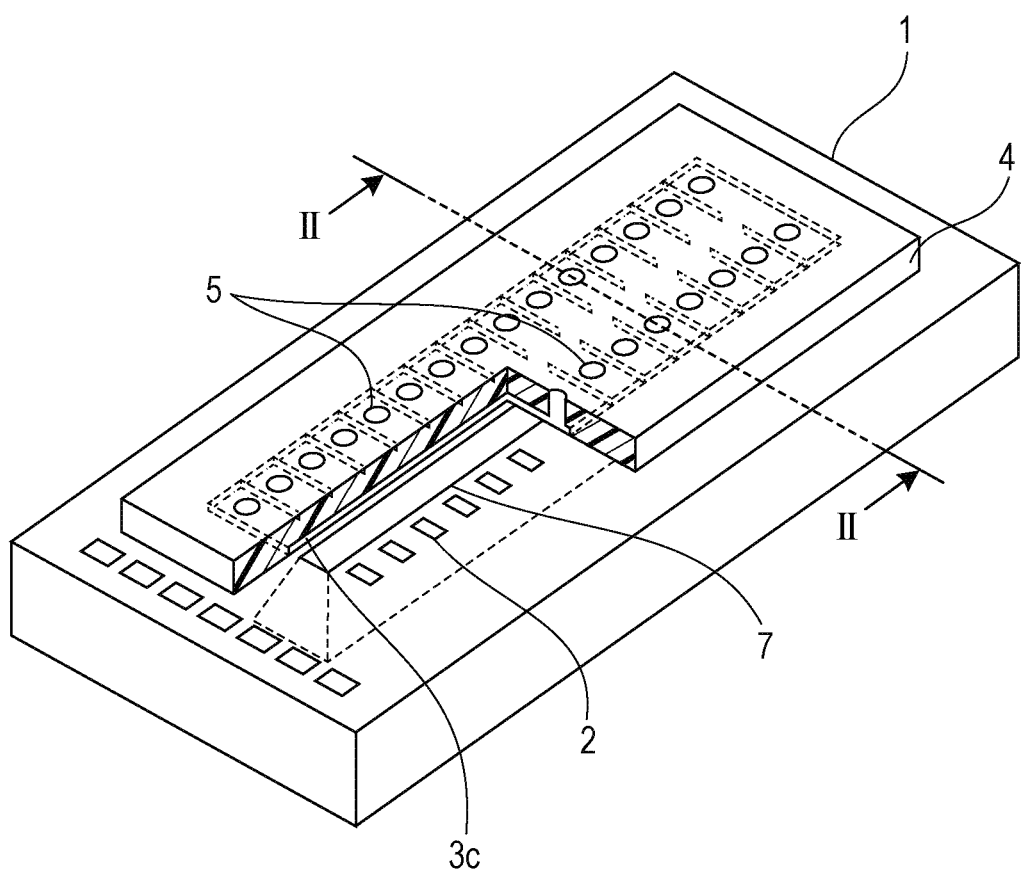
FIG. 1 is a perspective view of illustrating an example a liquid discharge head produced by a method according to an example embodiment.

According to the results of investigation by the present inventors, application of the method described in Japanese Patent No. 3011853 is restricted to cases of residues having acid or alkaline properties, and application of the method to a process of producing a liquid discharge head is therefore difficult. In addition, SEM is a destructive test and requires a vacuum measurement environment, and is therefore inappropriate as a test in a mass-production process, e.g., a process of producing liquid discharge heads.

In contrast, the present disclosure can detect an organic residue on a liquid repellent surface non-destructively and with high sensitivity.

Method of Inspecting Liquid Repellent Surface

An example of the method of detecting an organic residue on a liquid repellent surface according to the present disclosure includes the following steps (1) to (6): (1) a step of preparing a base material having a liquid repellent surface on which an organic substance is present; (2) a step of bringing a liquid A into contact with the liquid repellent surface; (3) a step of measuring the contact angle (i) of a liquid B on the liquid repellent surface with which the liquid A came into contact; (4) a step of heating and drying the base material; (5) a step of measuring the contact angle (ii) of the liquid B on the dried liquid repellent surface; and (6) a step of comparing the contact angle (i) with the contact angle (ii).

In a known method of inspecting a liquid repellent surface, the contact angle of the liquid repellent surface is measured only after a drying process. After the drying process, moisture removal and chemical reaction sufficiently progress, and the organic composition is chemically stabilized. Accordingly, it has been believed that when the contact angle of the liquid repellent surface is measured after the drying process, the contact angle is stabilized to give a measurement result having reliability. However, in this method, when a merely a small amount of an organic residue is present on the liquid repellent surface, since the liquid repellent surface and the organic residue are both hydrophobic, detection of a reduction in the contact angle due to the presence of the organic residue is difficult. That is, the method has a problem that high sensitive detection of an organic residue is difficult.

In the method according to the present disclosure, the measurement of a contact angle is also performed after the step of bringing a liquid into contact with the liquid repellent surface on which an organic substance is present and before the drying process (contact angle (i)), in addition to the measurement after the drying process (contact angle (ii)). In the measurement of the contact angle (i), since the organic substance is in contact with a liquid to form a hydrophilic state, the presence of the organic substance on the liquid repellent surface can be readily detected using the contact angle. That is, even if the size of the organic residue is minute and the amount thereof is very low, the organic residue can be detected non-destructively and with high sensitivity by verifying the difference between the contact angle (i) when the organic substance is in a hydrophilic state and the contact angle (ii) when the organic substance is in a hydrophobic state. As a result, reproduction treatment, such as rework, can be performed during the mass-production process, leading to a reduction in cost. Each step will now be described.

Step (1)

In Step (1), a base material having a liquid repellent surface on which an organic substance is present is prepared. The organic substance may be any substance and may have any structure as far as the substance mainly contains, for example, carbon, hydrogen, oxygen, and nitrogen, is a solid or a liquid having a certain degree of viscosity, and adheres to a liquid repellent surface. For example, the organic substance is a resin containing an alteration product. Examples of the resin include cyclized rubber resins; polymethyl isopropenyl ketone; polymethacrylate resins; and positive photosensitive resins, such as positive resins for i-rays, positive resins for KrF, positive resins for ArF, and polymethylglutarimide. On the surface of the organic substance, a part of the bonds of carbon is decomposed to partially generate a hydroxyl group, a carbonyl group, an aldehyde group, a carboxyl group, and an ester group showing hydrophilic properties. The alteration product has a further high degree of decomposition. In addition, these structures may be inherently incorporated in organic substances. When an organic substance having such a structure is exposed to a liquid, such as water or a solvent having polarity, the organic substance is hydrophilized by, for example, swelling by absorption of the liquid or causing a hydrolysis reaction. If the hydrophilized organic substance is exposed to a heating step, the swelling and hydrolysis are cancelled to hydrophobize the organic substance again.

The organic substance may be in an organic residue form or may be in an organic film form. When the organic substance is in an organic residue form, the residue is present on the liquid repellent surface. When the organic substance is in an organic film form, the organic film is in contact with the liquid repellent surface. The state of the surface being in contact with an organic film is, for example, a state in which the organic film covers the liquid repellent surface or a state in which patterned organic film is present on a part of the liquid repellent surface.

In the present disclosure, the term "liquid repellent surface" refers to a surface having a dynamic receding contact angle θr of 75° or more when the surface on which no organic residue is present is measured after the drying process using pure water as the liquid B with a micro contact angle meter. The liquid repellent surface may have any component and may be formed by any method, but from the viewpoint of expressing high liquid repellency, the liquid repellent surface can include a cured material of a condensation product of hydrolytic silane compounds including a hydrolytic silane compound having 20 or more fluorine atoms.

The hydrolytic silane compound having 20 or more fluorine atoms may have any structure having 20 or more fluorine atoms. For example, the hydrolytic silane compound includes a group containing fluorine atoms, such as a perfluoroalkyl group or a perfluoropolyether group. The hydrolytic silane compound having a perfluoroalkyl group can be, for example, $C_{10}F_{21}$—$C_2H_4$—$Si(OC_2H_5)_3$. The hydrolytic silane compound having a perfluoropolyether group can be, for example, a compound represented by Formula (1):

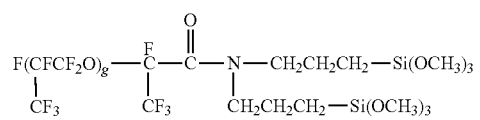

wherein g represents 3 to 10.

The condensation product may be a condensation product of hydrolytic silane compounds including a hydrolytic silane compound having a cationic polymerizable group, such as an epoxy group or an oxetane group, or a hydrolytic silane compound having an alkyl group, such as a methyl group or a trifluoromethyl group, in addition to a hydrolytic silane compound having 20 or more fluorine atoms. Furthermore, condensation products of hydrolytic silane compounds having 20 or more fluorine atoms described in, for example, PCT Japanese Translation Patent Publication No. 2007-518587 or Japanese Patent No. 5591361 can also be used.

The base material may be any material and may be, for example, a silicon substrate, but the substrate for a liquid discharge head described below can be the base material, which allows detection of an organic residue with high sensitivity in the process of producing a liquid discharge head.

Step (2)

In Step (2), a liquid A is brought into contact with the liquid repellent surface on which the organic substance is present. The liquid A is not particularly restricted and can be a liquid that hardly affects the liquid repellent surface and has a high effect of hydrophilizing the organic substance, and the liquid A can be at least one of a polar organic solvent and water. The polar organic solvent can be an organic solvent having a carbonyl group, a hydroxyl group, or an ether group. Examples of the organic solvent include an alkylene glycol monoalkyl ether carboxylate, an alkylene glycol monoalkyl ether, an alkyl lactate, an alkyl alkoxypropionate, a cyclic lactone (preferably having 4 to 10 carbon atoms), a monoketone compound (preferably having 4 to 10 carbon atoms) optionally having a cyclic moiety, an alkylene carbonate, an alkyl alkoxyacetate, an alkyl pyruvate, and an alkyl alcohol (preferably having 1 to 7 carbon atoms).

Examples of the alkylene glycol monoalkyl ether carboxylate include propylene glycol monomethyl ether acetate, propylene glycol monoethyl ether acetate, propylene glycol monopropyl ether acetate, propylene glycol monobutyl ether acetate, propylene glycol monomethyl ether propionate, propylene glycol monoethyl ether propionate, ethylene glycol monomethyl ether acetate, and ethylene glycol monoethyl ether acetate.

Examples of the alkylene glycol monoalkyl ether include propylene glycol monomethyl ether, propylene glycol monoethyl ether, propylene glycol monopropyl ether, propylene glycol monobutyl ether, ethylene glycol monomethyl ether, and ethylene glycol monoethyl ether.

Examples of the alkyl lactate include methyl lactate, ethyl lactate, propyl lactate, and butyl lactate.

Examples of the alkyl alkoxypropionate include ethyl 3-ethoxypropionate, methyl 3-methoxypropionate, methyl 3-ethoxypropionate, and ethyl 3-methoxypropionate.

Examples of the cyclic lactone include β-propiolactone, β-butyrolactone, γ-butyrolactone, α-methyl-γ-butyrolactone, β-methyl-γ-butyrolactone, γ-valerolactone, γ-caprolactone, γ-octanoic lactone, and α-hydroxy-γ-butyrolactone.

Examples of the monoketone compound optionally having a cyclic moiety include 2-butanone, 3-methylbutanone, pinacolone, 2-pentanone, 3-pentanone, 3-methyl-2-pentanone, 4-methyl-2-pentanone, 2-methyl-3-pentanone, 4,4-dimethyl-2-pentanone, 2,4-dimethyl-3-pentanone, 2,2,4,4-tetramethyl-3-pentanone, 2-hexanone, 3-hexanone, 5-methyl-3-hexanone, 2-heptanone, 3-heptanone, 4-heptanone, 2-methyl-3-heptanone, 5-methyl-3-heptanone, 2,6-dimethyl-4-heptanone, 2-octanone, 3-octanone, 2-nonanone, 3-nonanone, 5-nonanone, 2-decanone, 3-decanone, 4-decanone, 5-hexen-2-one, 3-penten-2-one, cyclopentanone, 2-methylcyclopentanone, 3-methylcyclopentanone, 2,2-dimethylcyclopentanone, 2,4,4-trimethylcyclopentanone, cyclohexanone, 3-methylcyclohexanone, 4-methylcyclohexanone, 4-ethylcyclohexanone, 2,2-dimethylcyclohexanone, 2,6-dimethylcyclohexanone, 2,2,6-trimethylcyclohexanone, cycloheptanone, 2-methylcycloheptanone, and 3-methylcycloheptanone.

Examples of the alkylene carbonate include propylene carbonate, vinylene carbonate, ethylene carbonate, and butylene carbonate.

Examples of the alkyl alkoxyacetate include 2-methoxyethyl acetate, 2-ethoxyethyl acetate, 2-(2-ethoxyethoxy) ethyl acetate, 3-methoxy-3-methylbutyl acetate, and 1-methoxy-2-propyl acetate.

Examples of the alkyl pyruvate include methyl pyruvate, ethyl pyruvate, and propyl pyruvate.

Examples of the alkyl alcohol include methanol, ethanol, isopropanol, 1-propanol, 2-propanol, tert-butanol, 1-butanol, 2-butanol, 1-pentanol, 2-pentanol, 3-pentanol, 1-hexanol, 2-hexanol, 3-hexanol, 1-heptanol, 2-heptanol, 3-heptanol, and 4-heptanol.

The liquid A can be at least one of an organic solvent having a hydroxyl group and water, from the viewpoint of particularly high effect of hydrophilizing the organic substance. Specifically, the liquid A is, for example, water such as pure water, propylene glycol monomethyl ether, propylene glycol monoethyl ether, methyl lactate, ethyl lactate, methanol, ethanol, isopropanol, 1-butanol, or 2-butanol. As the liquid A, these organic solvents and water may be used alone or in combination of two or more thereof.

When Step (1) is a process of forming an organic film on a liquid repellent surface to prepare a base material having a liquid repellent surface on which an organic film is present, Step (2) can be a step of bringing the liquid A into contact with the liquid repellent surface to remove the organic film from the liquid repellent surface (hereinafter, also referred to as a development step). In this case, the organic residue is a part of the organic film remaining without being removed from the liquid repellent surface in Step (2). In this case, Step (2) can further include a step of removing the liquid A by diluting or replacing the liquid A with a freshly added liquid A' (hereinafter, also referred to as a rinse step) after the removal of the organic film from the liquid repellent surface, from the viewpoint of preventing reattachment of the removed organic film. The contact of the liquid A with the liquid repellent surface and the dilution or replacement of the liquid A with the liquid A' can be performed by a dipping method, a showering method, or a puddling method. The organic residue in the present disclosure may be a residue of an organic substance adhered to the liquid repellent surface.

The liquid A' may be a liquid similar to the liquid A or may be the same liquid as the liquid A.

In the dipping method, a base material is immersed in a solution and is shaken, and the object is dissolved in the solution to be removed. The base material may be dipped by any method, and a combination with ultrasonic shaking can accelerate the effect of dissolving out the object in the solution. The base materials may be individually subjected to the dipping method or may be collectively subjected to the dipping method by being attached to a dedicated suspension tool.

In the showering method, a solution is constantly jetted in a shower shape from an ejection port, and a base material is allowed to intersect the shower of the solution. In this method, a fresh solution can be successively brought into contact with the base material acceleratedly. Consequently, an effect of dissolving and removing the object into the solution and an effect of physically removing the object by collision of droplets of the solution are obtained. The showering method may be any method that can achieve these effects. The base materials may be individually subjected to the showering method or may be collectively subjected to the showering method by being attached to a dedicated suspension tool.

In the puddling method, a film of a solution is formed on a surface of a base material, and an object is removed by being dissolved in the solution. The method of dropping a solution for forming a film of the solution is not particularly restricted. For example, a film of a solution can be formed by dropwise adding the solution through a slit-like opening or spraying mist of the solution with a sprayer to a surface of a base material.

The rinse step can include spin dry for finally removing the liquid A' by rotating the base material to which the liquid A' adhered as a rinse solution. The base materials may be individually spin-dried or may be collectively spin-dried by being set in a cassette and rotating the whole cassette. When the base materials are individually spin-dried, each base material can be concentrically rotated. The rotation speed can be 20 to 5000 revolutions per second (rps), preferably 100 to 4000 rps. The rotation time can be 10 seconds to 2 hours, preferably 30 seconds to 30 minutes. When the base materials are set to a cassette and the whole cassette is rotated, the rotation speed can be 1 to 100 rps, preferably 2 to 50 rps. The rotation time can be 30 seconds to 5 hours, preferably 1 minute to 2 hours.

In the spin dry, a gas may be simultaneously blown to the base material by any method. The gas to be blown can be, for example, dry air or nitrogen gas.

A step of exposing the liquid repellent surface to ultraviolet light can be further performed between Step (1) and Step (2). The organic substance is decomposed by the ultraviolet light to generate, for example, a carbonyl group or a hydroxyl group to accelerate the hydrophilization of the organic substance. The ultraviolet light may include deep ultraviolet light. The light source of the ultraviolet light, the exposure device, the exposure environment, the exposure light irradiation conditions, and other factors are not particularly restricted. The light source of the ultraviolet light can be a mercury lamp or LED. An example of the exposure device including a mercury lamp is CE-9000 (trade name, manufactured by Ushio Inc.).

Step (3)

In Step (3), the contact angle (i) of a liquid B on the liquid repellent surface with which the liquid A came into contact is measured. The contact angle (i) may be measured by any method, and the measurement device may be a contact angle meter or a micro contact angle meter. Herein, the contact angle meter measures a contact angle using a millimeter-sized droplet, and the micro contact angle meter measures a contact angle using a micron-sized droplet. The location of an organic residue is affected by, for example, the configuration of the surface structure to specify the region of the residue during the development step. Accordingly, from the viewpoint of capable of measuring a specified minute region and improving the accuracy of the measurement region, the contact angle (i) can be measured with a micro contact angle meter. The contact angle (i) may be a static contact angle or a dynamic contact angle. In particular, the contact angle (i) can be the dynamic receding contact angle θr measured with a micro contact angle meter.

The liquid B used in the measurement of the contact angle (i) may be any liquid, and examples thereof include water, such as pure water; and organic solvents, such as n-alkanes, alcohols, alkyl halides, glycerol, formamide, and dimethyl sulfoxide. Examples of the n-alkanes include heptane, decane, tetradecane, and heptadecane. Examples of the alcohols include methanol, ethanol, isopropanol, 1-propanol, 2-propanol, tert-butanol, 1-butanol, 2-butanol, 1-pentanol, 2-pentanol, 3-pentanol, 1-hexanol, 2-hexanol, 3-hexanol, 1-heptanol, 2-heptanol, 3-heptanol, 4-heptanol, 1-octanol, cyclohexanol, and ethylene glycol. Examples of the alkyl halides include 1-chlorobutane, 1-chlorohexane, 1-chlorooctane, iodocyclohexane, diiodemethane, chloroform, and α-bromonaphthalene. The liquid B can be pure water or an organic solvent, from the viewpoint of affinity with the surface conditions of organic residues, in particular pure water, methanol, ethanol, isopropanol, diiodomethane, or ethylene glycol. These liquids may be used alone or in combination of two or more thereof as the liquid B.

After Step (2), the base material may be left to stand as needed, and Step (3) may be then implemented. The base material can be left to stand for a certain period in an environment being clean and causing less changes in temperature and humidity, for example, the base material can be left to stance in a clean-room environment (temperature: 23.5° C., humidity: 45%). The leaving period is not particularly restricted, and the base material can be left to stand for 30 seconds to 1 year, preferably for 1 minute to 30 days, and more preferably for 2 minutes to 15 days.

Step (4)

In Step (4), the base material is heated and dried. The heating temperature may be in any range that does not affect the liquid repellency of the liquid repellent surface and other components. However, from the viewpoint of sufficiently hydrophobizing the organic substance in a hydrophilic state, the heating temperature can be 50° C. or more and 400° C. or less, preferably 80° C. or more and 300° C. or less, and more preferably 100° C. or more and 250° C. or less. The heating time is also not particularly restricted and can be 60 seconds or more and 7 days or less, preferably 120 seconds or more and 3 days or less, and more preferably 180 seconds or more and 1 day or less. The heating may be performed with any heating apparatus and in any heating form, and a hot plate or oven can be used. In particular, a hot plate or oven adjusted under a nitrogen atmosphere can be used.

Step (5)

In Step (5), the contact angle (ii) of the liquid B on the dried liquid repellent surface is measured. The contact angle (ii) is measured as in the measurement of the contact angle (i) in Step (3).

Step (6)

In Step (6), the contact angle (i) is compared with the contact angle (ii). For example, the contact angle (i) is subtracted from the contact angle (ii), and the presence of an organic residue on the liquid repellent surface is recognized when the resulting difference is equal to or higher than a predetermined value. In this step, the difference Δ in contact angle measurement values is calculated by the following Expression 1:

$$\text{Difference } \Delta \text{ in contact angle measurement values} = (\text{contact angle}(ii)) - (\text{contact angle}(i)).$$

When the difference Δ in contact angle measurement values is equal to or higher than a predetermined value, the presence of an organic residue on the liquid repellent surface is recognized. Herein, the term "predetermined value" refers to a value of the difference Δ in contact angle measurement values when organic residue is present on the liquid repellent surface. For example, when the liquid B is pure water and the heating temperature is 100° C. or more and 250° C. or less, the presence of an organic residue on the liquid repellent surface can be recognized if the difference Δ in contact angle measurement values is 14° or more, preferably 15° or more, and more preferably 17° or more.

In the method according to the present disclosure, the contact angle (ii) is measured at least once. The measurement of the contact angle (i) and the measurement of the contact angle (ii) may be performed with the same sample or with different samples subjected to the same process, and the measurement values may be compared. That is, the contact angle (ii) is first measured as a reference sample, and the measurement value is used as the reference value. The contact angle (i) of an object to be inspected, i.e., another sample subjected to the same process, is then measured and may be compared to the reference value previously obtained.

Method of Producing Liquid Discharge Head

The method according to the present disclosure of producing a liquid discharge head including a substrate and a discharge port-forming member formed on the substrate and having liquid discharge ports comprises the following steps: a step of forming a resin layer having a liquid repellent surface on a substrate; a step of forming discharge ports on the liquid repellent surface of the resin layer; a step of forming a protective film containing an organic substance so as to cover the resin layer provided with the discharge ports; a step of bringing a liquid A into contact with the protective film to remove the protective film; a step of measuring the contact angle (i) of a liquid B on the liquid repellent surface with which the liquid A came into contact; a step of heating and drying the substrate; a step of measuring the contact angle (ii) of the liquid B on the dried liquid repellent surface; and a step of subtracting the contact angle (i) from the contact angle (ii) and recognizing the presence of an organic residue derived from the protective film on the liquid repellent surface when the resulting difference is equal to or higher than a predetermined value.

The method according to the present disclosure of producing a liquid discharge head including a substrate and a discharge port-forming member formed on the substrate and provided with liquid discharge ports and a liquid flow channel communicating with the discharge ports comprises the following steps: a step of forming a mold material for a flow channel containing an organic substance A on a substrate; a step of forming a resin layer having a liquid repellent surface on the substrate and the mold material; a step of forming discharge ports on the liquid repellent surface of the resin layer; a step of forming a protective film containing an organic substance B so as to cover the resin layer provided with the discharge ports; a step of bringing a liquid A1 into contact with the protective film to remove the protective film; a step of bringing a liquid A2 into contact with the mold material to remove the mold material; a step of measuring the contact angle (i) of a liquid B on the liquid repellent surface with which the liquid A2 came into contact; a step of heating and drying the substrate; a step of measuring the contact angle (ii) of the liquid B on the dried liquid repellent surface; and a step of subtracting the contact angle (i) from the contact angle (ii) and recognizing the presence of an organic residue derived from at least one of the mold material and the protective film on the liquid repellent surface when the resulting difference is equal to or higher than a predetermined value.

In the method of producing a liquid discharge head according to the present disclosure, whether an organic residue is present on a liquid repellent surface or not can be detected with high sensitivity, and liquid discharge heads exhibiting good liquid discharge performance can be efficiently produced with high productivity. In addition, reproduction treatment, such as rework, can be performed during the mass-production process, leading to a reduction in cost. An embodiment of the method of producing a liquid discharge head according to the present disclosure will now be described with reference to the drawings. In the following description, the same configurations having the same functions are designated with the same reference numerals in the drawings, and descriptions thereof may be omitted. The method of detecting an organic residue on a surface of a base material according to the present disclosure can be applied to various uses without being limited to production of liquid discharge heads described below. The liquid discharge heads produced by the method according to the present disclosure can be suitably used as inkjet recording heads that can discharge ink to perform recording on recording media.

FIG. 1 is a schematic cross-sectional view of a liquid discharge head produced by the method according to the present disclosure. The substrate 1 is provided with, for example, energy-generating elements 2 for applying discharge energy to a liquid and a circuit (not shown) for driving the elements 2. In addition, the substrate 1 is provided with a liquid supply passage 7 communicating between both surfaces of the substrate 1. A discharge port-forming member 4 is disposed on the substrate 1. The member 4 includes discharge ports 5 for discharging a liquid disposed so as to correspond to the energy-generating elements 2 and a liquid flow channel 3c for supplying the liquid to the discharge ports 5. The liquid supplied to the flow channel 3c from the supply passage 7 foams by the driving of the energy-generating elements 2 and is discharged from the discharge ports 5 by means of the pressure of the foam.

FIGS. 2A to 2I are schematic cross-sectional views illustrating an example of the method of producing a liquid discharge head shown in FIG. 1 and show the cross sections taken along line II-II in FIG. 1 at the respective production steps.

Figure 2A:
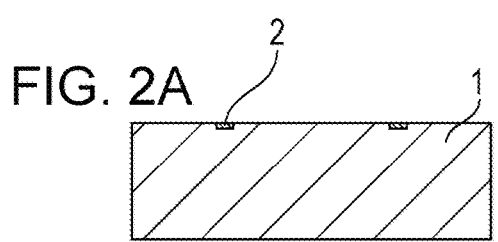
FIGS. 2A to 2I are cross-sectional views illustrating each step of a method of producing a liquid discharge head according to an example embodiment.

As shown in FIG. 2A, a substrate 1 provided with energy-generating elements 2 is prepared. The substrate 1 can be, for example, a silicon substrate.

Figure 2E:
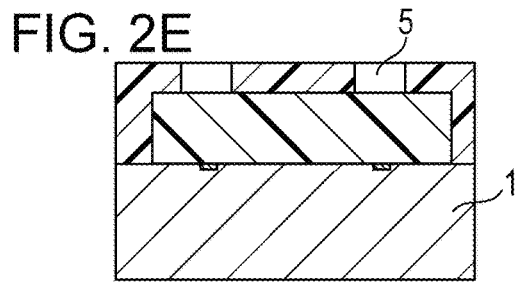
Figure 2B:
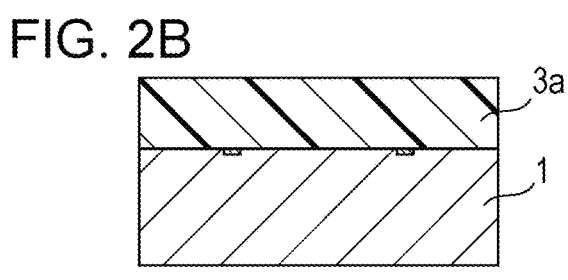

Subsequently, as shown in FIG. 2B, a positive photosensitive resin layer 3a is formed on the substrate 1. The positive photosensitive resin layer 3a may contain any positive photosensitive resin that is resistant to the patterning of a coating layer 4 described below. The resin is, for example, a material having resistance such that a pattern of the material is not broken by the solvent applied when the coating layer 4 is formed. Specifically, the positive photosensitive resin can be a photolytic polymer positive resist, such as polymethyl isopropenyl ketone, polymethyl methacrylate, and polymethylglutarimide. In order to prevent pattern failure due to sensitization during the exposure of the coating layer 4, a material, such as polymethyl isopropenyl ketone, showing low absorbance at the exposure wavelength of the coating layer 4 can be used. These resins may be used alone or in combination of two or more thereof. The positive photosensitive resin layer 3a can be formed by, for example, dissolving a positive photosensitive resin in an appropriate solvent, applying the solution by spin coating, and then evaporating the solvent by baking. The thickness of the positive photosensitive resin layer 3a is the desired height of the flow channel and is appropriately determined in designing of the liquid discharge head without being particularly restricted.

Figure 2F:
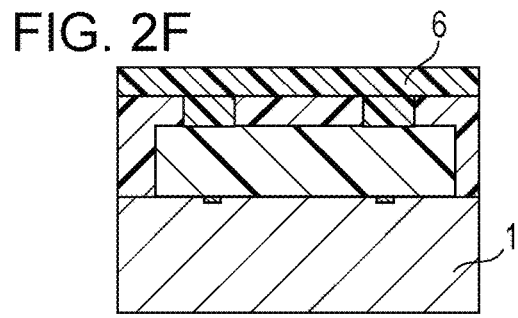
Figure 2C:
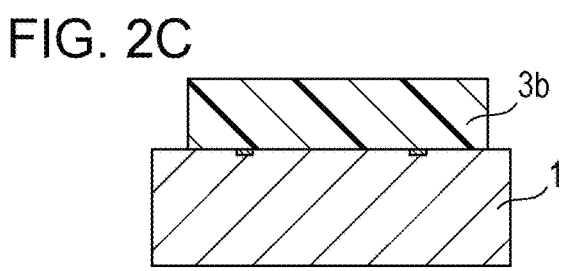

Subsequently, as shown in FIG. 2C, the positive photosensitive resin layer 3a is patterned to form the mold material 3b for a flow channel. The positive photosensitive resin layer 3a can be patterned by, for example, irradiating the positive photosensitive resin layer 3a with active energy rays allowing exposure of the positive photosensitive resin optionally through a mask to perform pattern exposure. A mold material 3b can be then formed by development using, for example, a solvent capable of dissolving the exposed portion of the positive photosensitive resin layer 3a.

Figure 2G:
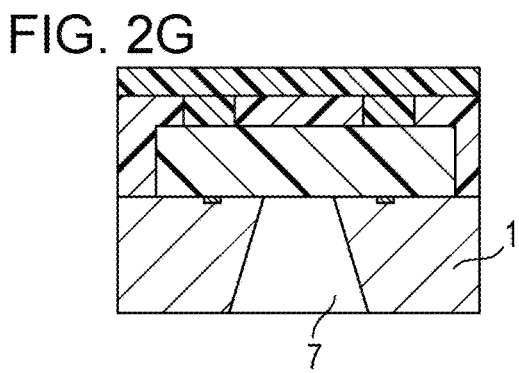
Figure 2D:
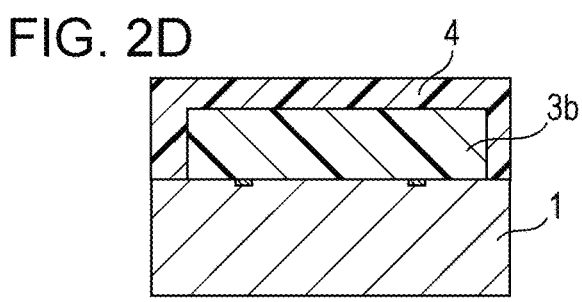

Subsequently, as shown in FIG. 2D, a coating layer 4 having a liquid repellent surface is formed on the substrate 1 and the mold material 3b. The coating layer 4 becomes a discharge port-forming member later and can contain, for example, a cationic polymerizable resin and a cationic polymerization initiator. The cationic polymerizable resin can be, for example, a photocationic polymerizable resin containing an epoxy resin, a vinyl ether compound, or an oxetane compound. In particular, since the coating layer 4 is required to have a high mechanical strength and high adhesiveness to the base material, a photocationic polymerizable resin containing an epoxy resin having these characteristics can be used. Examples of the epoxy resin include bisphenol A epoxy resins and novolac epoxy resins, and commercially available products, such as SU8 (trade name, manufactured by Nippon Kayaku Co., Ltd.) and EHPE-3150 (trade name, manufactured by Daicel Corporation). The epoxy resin can have an epoxy equivalent of 2000 or less, preferably 1000 or less. If the epoxy equivalent is 2000 or less, the crosslink density does not decrease during a hardening reaction, and the glass transition temperature of the cured material and the adhesiveness can be prevented from decreasing. In addition, from the viewpoint of a low fluidity of a coating film and a high resolution, the cationic polymerizable resin can be solid at 35° C. or less. As the cationic polymerization initiator, for example, an onium salt, which is a photopolymerization initiator, such as an ionic sulfonium salt or iodonium salt, can be widely used. In particular, from the viewpoint of a high cationic polymerization activity, the photopolymerization initiator can be an onium salt having a phosphorus anion $PF_6$ or an antimony anion $SbF_6$ as the anion.

The coating layer 4 can be formed by, for example, dissolving a material of the coating layer 4 in an appropriate solvent and applying the solution onto the substrate 1 and the mold material 3b by spin coating. When a solvent is used, a solvent that hardly dissolves the mold material 3b can be used. The liquid repellent surface can be formed by, for example, applying a solution containing a material capable of forming a liquid repellent surface and an organic solvent onto an uncured coating layer 4 by spin coating or slit coating and removing the organic solvent. The material capable of forming a liquid repellent surface can be the above-described condensation product of hydrolytic silane compounds including a hydrolytic silane compound having 20 or more fluorine atoms. A clear boundary line need not be observed between the coating layer 4 and the liquid repellent surface.

Subsequently, as shown in FIG. 2E, discharge ports 5 are formed in the coating layer 4. The discharge ports 5 can be formed by, for example, irradiating the coating layer 4 with ultraviolet light optionally using a mask provided with a light shielding portion, then performing heat treatment for accelerating the hardening reaction of the exposed portion of the coating layer 4, and developing the unexposed portion of the coating layer 4. As the ultraviolet light, for example, i-rays can be used. The heat treatment can accelerate the hardening reaction of the exposed portion to provide resistance in the subsequent development step. The developing solution used in the development may be any solution capable of developing the unexposed portion of the coating layer 4. For example, methyl isobutyl ketone (MIBK) or xylene can be used. In addition, rinse treatment may be performed after the development treatment. The rinse solution used in the rinse treatment is, for example, isopropanol. The substrate 1 can be then heated. The heating temperature can be, for example, 100° C. or more and 250° C. or less. The heating can be performed with, for example, a hot plate or an oven.

Subsequently, as shown in FIG. 2F, a protective film 6 is formed so as to cover the surface of the substrate 1 on the side provided with the coating layer 4. In this step, in order to protect the formed coating layer 4 and so on from the etching solution used in the subsequent anisotropic etching of the substrate 1, the protective film 6 is previously formed. The protective film 6 corresponds to the organic film in the inspection method according to the present disclosure. That is, this step corresponds to a step of forming an organic film (protective film 6) on the liquid repellent surface to prepare a base material having a liquid repellent surface on which the organic film (protective film 6) is present, i.e., Step (1) in the inspection method according to the present disclosure. The material of the protective film 6 may be any material showing alkali resistance properties in alkali etching, not chemically invading functional elements, having high adhesiveness to a structure being in contact with, and capable of being easily removed after etching, and can be a cyclized rubber resin. Commercially available examples thereof include OBC (trade name, manufactured by Tokyo Ohka Kogyo Co., Ltd.). The protective film 6 can be formed by, for example, dissolving a cyclized rubber resin in a solvent, applying the solution by spin coating, and baking the coating film. The solvent can be, for example, xylene.

Subsequently, as shown in FIG. 2G, s liquid supply passage 7 is formed in the substrate 1. The liquid supply passage 7 can be formed by, for example, subjecting the substrate 1 to anisotropic etching. The etching solution used in the anisotropic etching can be, for example, a tetramethyl ammonium hydroxide (TMAH) solution.

Figure 2H:
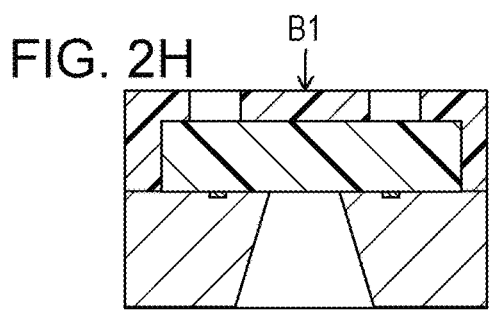

Subsequently, as shown in FIG. 2H, the protective film 6 is peeled off. The protective film 6 can be peeled off by bringing a solution into contact with the protective film 6. That is, this step corresponds to a step of bringing a liquid A (A1) into contact with the liquid repellent surface to remove the organic film (protective film 6) from the liquid repellent surface, i.e., Step (2) in the inspection method according to the present disclosure. For example, when the material of the protective film 6 is OBC (trade name, manufactured by Tokyo Ohka Kogyo Co., Ltd.), the protective film 6 can be peeled off with xylene. The method of peeling-off of the protective film 6 can be, for example, dipping or spraying. Subsequently, spray rinse and spin dry with a spin dryer may be performed. The substrate 1 may be then left to stand as needed. A part of the protective film 6 remaining as the residue without being removed from the liquid repellent surface after the peeling-off of the protective film 6 corresponds to the organic residue in the inspection method according to the present disclosure. The organic residue can be, for example, the protective film 6 of which a partial oxidation reaction has progressed.

Subsequently, the contact angle (i) can be measured. This step corresponds to a step of measuring the contact angle (i) of a liquid B on the liquid repellent surface with which the liquid A (A1) came into contact, i.e., Step (3) in the inspection method according to the present disclosure. The contact angle (i) can be measured at, for example, the position B1 in FIG. 2H. The contact angle (i) can be measured by the above-described method. The contact angle (i) may be measured after the removal of the mold material 3b described below.

Figure 2I:
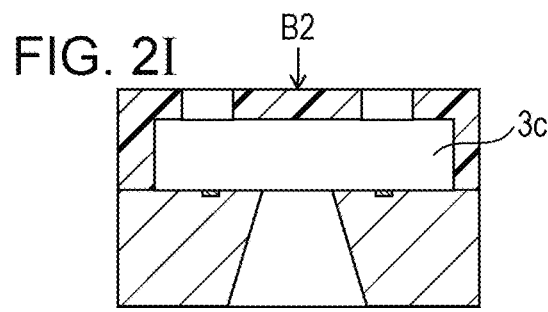

Subsequently, as shown in FIG. 2I, the mold material 3b is removed to form a flow channel 3c. The mold material 3b is removed by, for example, dipping, i.e., immersing the substrate 1 in a solvent capable of dissolving the mold material 3b to remove the mold material 3b. That is, this step corresponds to a step of bringing a liquid A (A2) into contact with a liquid repellent surface, i.e., Step (3) in the inspection method according to the present disclosure. The solvent capable of dissolving the mold material 3b varies depending on the type of the mold material 3b, and is, for example, methyl lactate. Furthermore, the solubility of the mold material 3b in a solvent may be optionally increased by exposing the mold material 3b to active energy rays that can decompose the mold material 3b or by shaking the mold material 3b with ultrasonic waves simultaneously with dipping. Subsequently, spray rinse and spin dry with a spin dryer may be performed. In this step, the mold material 3b dissolved in a solvent may adhere to the liquid repellent surface during the step of removing the material 3b. The adhered substance also corresponds to the organic residue in the present disclosure.

Subsequently, the contact angle (i) can be measured. This step corresponds to a step of measuring the contact angle (i) of a liquid B on the liquid repellent surface with which the liquid A (A2) came into contact, i.e., Step (3) in the inspection method according to the present disclosure. The contact angle (i) can be measured at, for example, the position B2 in FIG. 2I, which corresponds to the position B1 in FIG. 2H. The contact angle (i) can be measured by the above-described method. The contact angle (i) may be measured after the peeling-off of the protective film 6 as described above or after the removal of the mold material 3b, or may be measured after the peeling-off of the protective film 6 and also after the removal of the mold material 3b.

Subsequently, the substrate 1 is heated. This step corresponds to a step of heating and drying the base material, i.e., Step (4) in the inspection method according to the present disclosure. The heating temperature can be, for example, 100° C. or more and 250° C. or less. The heating can be performed with, for example, a hot plate or an oven and may be performed under a nitrogen atmosphere.

Subsequently, the substrate 1 is sufficiently cooled, and the contact angle (ii) is then measured. This step corresponds to a step of measuring the contact angle (ii) of the liquid B on the dried liquid repellent surface, i.e., Step (5) in the inspection method according to the present disclosure. The contact angle (ii) can be measured at, for example, the position B2 in FIG. 2I, which corresponds to the position B1 in FIG. 2H. The contact angle (ii) can be measured by the above-described method.

Subsequently, when the difference obtained by subtracting the contact angle (i) from the contact angle (ii) is equal to or higher than a predetermined value, the presence of an organic residue on the liquid repellent surface is recognized. This step corresponds to Step (6) in the inspection method according to the present disclosure. Specifically, the judgment can be done by the above-described method. Consequently, whether an organic residue is present on a liquid repellent surface or not can be determined with high sensitivity. The substrate 1 having an organic residue on the liquid repellent surface is subjected to reproduction treatment, such as rework, to achieve a reduction in cost.

Subsequently, electrical bonding for driving the energy-generating elements 2 and connection of a liquid supply member and other components for liquid supply are performed to accomplish a liquid discharge head. Since the liquid discharge head does not have any organic residue on the liquid repellent surface, the liquid repellent surface shows high liquid repellency in the vicinities of the discharge ports, and good liquid discharge performance is achieved.

EXAMPLES

Experimental Example 1

Sample 1

An organic film corresponding to a protective film was formed by applying a solution of OBC (trade name, manufactured by Tokyo Ohka Kogyo Co., Ltd.) in xylene onto a silicon substrate by spin coating and performing oven baking at 110° C. for 15 minutes. Consequently, Sample 1 was prepared. The Sample 1 was subjected to each step shown in Table 1. In the measurement of the contact angle, the dynamic receding contact angle θr of pure water was measured on the surface of an organic film with a micro contact angle meter (product name: DropMeasure, manufactured by Microjet Corporation). The full surface exposure in the 2nd step was performed with CE-9000 (trade name, manufactured by Ushio Inc.) through a cut filter blocking deep ultraviolet light having wavelengths shorter than 270 nm. In Table 1, "hydrophobic" refers to that the contact angle of pure water is 70° or more, and "hydrophobic" refers to that the contact angle is 25° or less.

Sample 2

A solution prepared by dissolving 100 parts by mass of a cationic polymerizable resin (trade name: EHPE-3150, manufactured by Daicel Corporation) and 6 parts by mass a photocationic polymerization initiator (trade name: SP-172, manufactured by Adeka Corporation) in a solvent was applied onto a silica substrate by spin coating. Consequently, a layer corresponding to a coating layer was formed.

Subsequently, glycidylpropyl triethoxysilane (0.1 mol), methytriethoxysilane (0.1 mol), $C_{10}F_{21}$—$C_2H_4$—Si$(OC_2H_5)_3$ (0.013 mol), and ethanol were stirred at room temperature. The mixture was then refluxed for 24 hours to give a hydrolytic condensation product. The hydrolytic condensation product was then diluted with 2-butanol and ethanol to a non-volatile matter content of 7 mass % to give composition A. Subsequently, the composition A was applied onto the layer corresponding to the coating layer by slit coating, followed by heat treatment at 70° C. for 3 minutes. Thus, a liquid repellent surface was formed on the surface of the layer corresponding the coating layer.

Subsequently, exposure to short-wavelength i-rays through a mask having light shielding portions corresponding to discharge ports and then heat treatment at 95° C. for 4 minutes were performed. Subsequently, development treatment with a solution mixture of MIBK and xylene, then rinse treatment with isopropanol, and then heat treatment with a hot plate at 140° C. for 4 minutes were performed. Consequently, Sample 2 was prepared. The Sample 2 was subjected to each step shown in Table 1. The contact angles were measured as in Sample 1.

TABLE 1

| Order of steps | Step | Conditions | Details of conditions | Results of measurement of contact angle | |
|---|---|---|---|---|---|
| | | | | Sample 1 | Sample 2 |
| 1 | Measurement of contact angle (initial) | Measurement solution System | pure water micro contact angle | 82° (hydrophobic) | 95° (hydrophobic) |
| 2 | Bringing liquid A into contact with the surface | Full surface exposure Liquid A System | exposure dose of 27 J/cm² pure water dipping | — | — |
| 3 | Measurement of contact angle (i) | Liquid B System | pure water micro contact angle | 17° (hydrophilic) | 80° (hydrophobic) |
| 4 | Heating and drying | Heating temperature Heating time | 200° C. 1 hour | — | — |
| 5 | Measurement of contact angle (ii) | Liquid B System | pure water micro contact angle | 75° (hydrophobic) | 93° (hydrophobic) |
| 6 | Bringing liquid A into contact with the surface | Liquid A System Ultrasonic shaking | pure water dipping 400 W for 1 hr | — | — |
| 7 | Measurement of contact angle (i) | Liquid B System | pure water micro contact angle | 20° (hydrophilic) | 79° (hydrophobic) |
| 8 | Heating and drying | Oven baking | 200° C. for 1 hr | — | — |
| 9 | Measurement of contact angle (ii) | Liquid B System | pure water micro contact angle | 72° (hydrophobic) | 92° (hydrophobic) |

In Sample 1 having an organic film, the organic film was hydrophobic in the initial stage (the 1st step). The organic film was then changed to hydrophilic by full surface exposure and contact with pure water (the 3rd step). Sample 1 was dried at 200° C., and the contact angle measured after the drying indicated that the organic film changed to hydrophobic (the 5th step). The surface of Sample 1 was immersed in pure water with ultrasonic shaking, which made the organic film hydrophilic (the 7th step). Sample 1 was dried at 200° C. again, and the contact angle measured after the drying demonstrated that the organic film was changed to hydrophobic (the 9th step). In contract, in Sample 2 not having an organic film, the liquid repellent surface was hydrophobic throughout from the 1st step to the 9th step. Consequently, it was demonstrated that the liquid repellent surface maintains the hydrophobicity and has less change in hydrophilicity and hydrophobicity compared to the organic substance having a property of largely changing from hydrophilic to hydrophobic in the steps.

Example 1

First, as shown in FIG. 2A, a silicon substrate 1 provided with energy-generating elements 2 was prepared.

Subsequently, as shown in FIG. 2B, a positive photosensitive resin layer 3a was formed on the substrate 1. Specifically, polymethyl isopropenyl ketone, which is a photolytic photosensitive resin, was dissolved in a solvent, and the resulting solution was applied onto the substrate 1 by spin coating. Subsequently, the solvent was evaporated by baking to form a positive photosensitive resin layer 3a having a thickness of 14 μm.

Subsequently, as shown in FIG. 2C, the positive photosensitive resin layer 3a was patterned to form a mold material 3b for a flow channel. Specifically, the positive photosensitive resin layer 3a was irradiated with active energy rays allowing exposure of polymethyl isopropenyl ketone through a mask to perform pattern exposure. Development with a solvent capable of dissolving the exposed portion was then performed to form a mold material 3b.

Subsequently, as shown in FIG. 2D, a coating layer 4 having a liquid repellent surface A was formed on the substrate 1 and the mold material 3b. Specifically, 100 parts by mass of a cationic polymerizable resin (trade name: EHPE-3150, manufactured by Daicel Corporation) and a 6 parts by mass of a photocationic polymerization initiator (trade name: SP-172, manufactured by Adeka Corporation) were dissolved in a solvent, and the resulting solution was applied onto the substrate 1 and the mold material 3b by spin coating. Consequently, a coating layer 4 was formed. Subsequently, glycidylpropyl triethoxysilane (0.1 mol), methyltriethoxysilane (0.1 mol), $C_{10}F_{21}$—$C_2H_4$—Si$(OC_2H_5)_3$ (0.013 mol), and ethanol were stirred at room temperature. The mixture was then refluxed for 24 hours to give a hydrolytic condensation product. The hydrolytic condensation product was then diluted with 2-butanol and ethanol to a non-volatile matter content of 7 mass % to give composition A. Subsequently, the composition A was applied onto the coating layer 4 by slit coating, followed by heat treatment at 70° C. for 3 minutes. Thus, a liquid repellent surface A was formed on the surface of the coating layer 4.

Subsequently, as shown in FIG. 2E, discharge ports 5 were formed in the coating layer 4. Specifically, the coating layer 4 was exposed with short-wavelength i-rays through a mask having light shielding portions corresponding to the discharge ports 5 and was then heated at 95° C. for 4 minutes. Subsequently, development treatment with a solution mixture of MIBK and xylene, then rinse treatment with isopropanol, and then heat treatment at 140° C. for 4 minutes with a hot plate were performed to form discharge ports 5.

Subsequently, as shown in FIG. 2F, a protective film 6 was formed so as to cover the surface of the substrate 1 on the side provided with the coating layer 4. Specifically, the protective film 6 was formed by spin coating of a solution of OBC (trade name, manufactured by Tokyo Ohka Kogyo Co., Ltd.) in xylene and oven baking at 110° C. for 15 minutes.

Subsequently, as shown in FIG. 2G, a liquid supply passage 7 was formed in the substrate 1. Specifically, the substrate 1 was anisotropically etched with a 22 mass % TMAH solution at an etching solution temperature of 80° C. to form a supply passage 7.

Subsequently, as shown in FIG. 2H, the protective film 6 was peeled off. Specifically, the substrate 1 was dipped in xylene as a development step. Subsequently, the xylene was rinsed by a showering method as a rinse step. Subsequently, the protective film 6 was peeled off by spin dry with a spin dryer. In Tables 2 and 3, this step is shown as Step (2).

Figure 3:
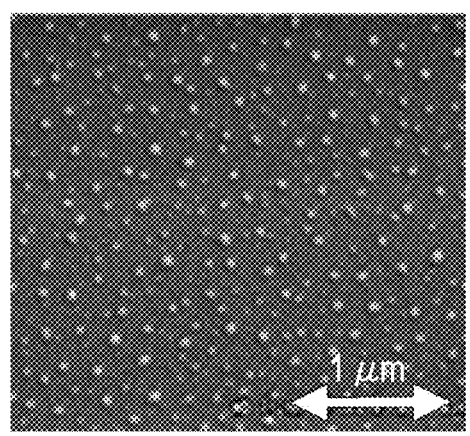
FIG. 3 is an SEM observation image of an organic residue on a liquid repellent surface in Example 1.

Subsequently, the substrate 1 was left to stand in a clean room environment (temperature: 23.5° C., humidity: 45%) for 1 day. The position B1 in FIG. 2H was then checked the presence of organic residue with an SEM (manufactured by Hitachi High-Technologies Corporation, product name: S-4300, magnification: 50000×). As shown in FIG. 3, a minute residue was observed. The results of elemental analysis demonstrated that the residue was the protective film 6 of which a partial oxidation reaction progressed. That is, it was demonstrated that the residue was a part of the protective film 6 remained without being peeled off from the coating layer 4.

Subsequently, as shown in FIG. 2I, the mold material 3b was removed to form a flow channel 3c. Specifically, the full surface of the substrate 1 was exposed to light (27 J/cm$^2$) with CE-9000 (trade name, manufactured by Ushio Inc.). Subsequently, the substrate 1 was dipped in methyl lactate for 1 hour with ultrasonic shaking. Subsequently, methyl lactate was rinsed by a showering method as a rinse step, followed by spin dry with a spin dryer to form a flow channel 3c. In Tables 2 and 3, this step is shown as Step (2)'.

Figure 4:
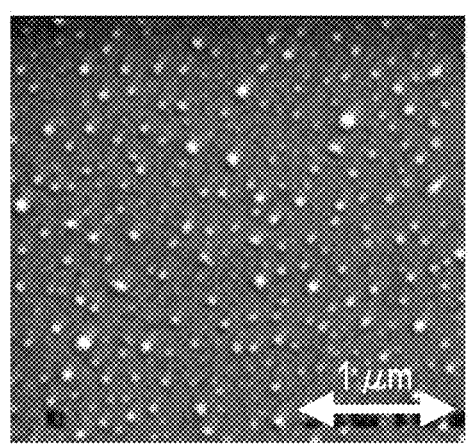
FIG. 4 is an SEM observation image of an organic residue on a liquid repellent surface in Example 1.

Subsequently, the substrate 1 was left to stand in a clean room environment (temperature: 23.5° C., humidity: 45%) for 1 day. The contact angle (i) was then measured at the position B2 in FIG. 2I as in Experimental Example 1. In Tables 2 and 3, this step is shown as Step (3)'. The position B2 in FIG. 2I was then checked the presence of an organic residue with an SEM (manufactured by Hitachi High-Technologies Corporation, product name: S-4300, magnification: 50000×). As shown in FIG. 4, a minute residue was observed. The results of elemental analysis demonstrated that the residue was a mixture of residues of the protective film 6 and the mold material 3b. That is, it was demonstrated that the residue included a residue of the protective film 6 and also a residue of the mold material 3b dissolved in methyl lactate and adhered to the coating layer 4 during the step of removing the mold material 3b.

Subsequently, the substrate 1 was heated and dried at 200° C. for 1 hour under a nitrogen atmosphere in an oven. In Tables 2 and 3, this step is shown as Step (4). The substrate 1 taken out from the oven was then cooled in a clean room environment (temperature: 23.5° C., humidity: 45%) for 1 hour and was then left to stand for 1 day. The contact angle (ii) was then measured at the position B2 in FIG. 2I as in Experimental Example 1. In Tables 2 and 3, this step is shown as Step (5). The position B2 in FIG. 2I was then checked the presence of an organic residue with an SEM (manufactured by Hitachi High-Technologies Corporation, product name: S-4300, magnification: 50000×). The results are shown in Table 2.

Figure 5:
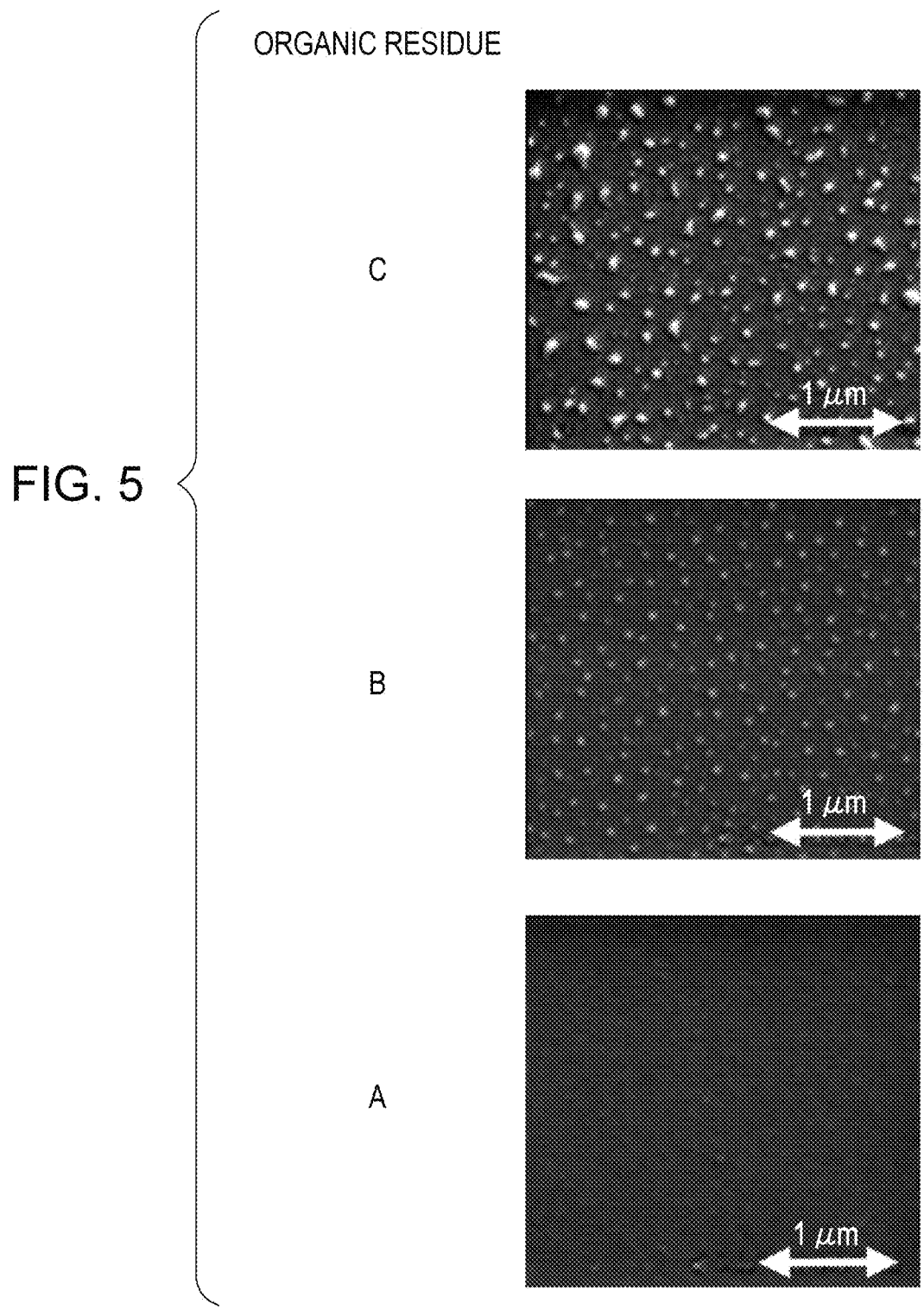
FIG. 5 shows criteria for evaluating whether an organic residue is present or not in SEM observation.

In the evaluation of organic residues (SEM), the criteria of A (no organic residue), B (low degree of organic residue), and C (existence of organic residue) were determined based on the degrees of the organic residue shown in FIG. 5.

Examples 2 to 11 and Comparative Examples 1 to 3

Each step in Example 1 was performed as in Example 1 except that the conditions of each step were changed as shown in Tables 2 and 3. In Example 6, the static contact angles were measured with a contact angle meter (product name: DM-901, manufactured by Kyowa Interface Science Co., Ltd.) using pure water as the measurement solution liquid B. In Example 8, the dynamic receding contact angles θr were measured using ethanol as the measurement solution liquid B. In Example 9, the liquid repellent surface B was formed as in Example 1 except that $C_{10}F_{21}$—$C_2H_4$—$Si(OC_2H_5)_3$ in the formation of a liquid repellent surface was replaced by a compound represented by Formula (1):

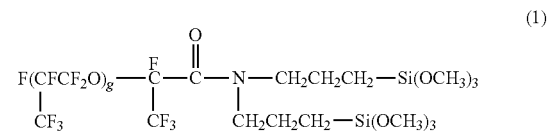

(1)

wherein, g represents 3 to 10.

In Example 11, the protective film 6 was peeled off in Step (2), and the substrate 1 was left to stand in a clean room environment (temperature: 23.5° C., humidity: 45%) for 1 day. The contact angle (i) was then measured at the position B1 in FIG. 2H as in Experimental Example 1. In Tables 2 and 3, this step is shown as Step (3).

TABLE 2

|  |  |  |  | Example 1 | Example 2 | Example 3 | Example 4 |
|---|---|---|---|---|---|---|---|
| Liquid repellent surface |  |  |  | liquid repellent surface A | liquid repellent surface A | liquid repellent surface A | liquid repellent surface A |
| Step | Step (2) | Development step | Liquid A1 System | xylene dipping | xylene dipping | xylene dipping | xylene dipping |
|  |  | Rinse step | Liquid A1' System | xylene showering | xylene showering | xylene puddling | xylene showering |
|  | Step (3) |  | Liquid B System | — | — | — | — |
|  | Step (2)' | Full surface exposure (CE-9000) |  | 27 J/cm$^2$ | — | — | — |
|  |  | Development step | Liquid A2 System | methyl lactate dipping | methyl lactate dipping | methyl lactate dipping | methyl lactate puddling |
|  |  |  | Ultrasonic shaking | 400 W, 1 hr | 400 W, 1 hr | — | 400 W, 1 hr |

TABLE 2-continued

|  |  |  |  |  |  |  |  |
|---|---|---|---|---|---|---|---|
|  |  | Rinse step | Liquid A2' System | methyl lactate showering | methyl lactate showering | methyl lactate showering | methyl lactate puddling |
|  | Step (3)' | Liquid B System | | pure water micro contact angle | pure water micro contact angle | pure water micro contact angle | pure water micro contact angle |
|  | Step (4) | Heating temperature | | 200° C. | 200° C. | 200° C. | 200° C. |
|  |  | Heating time | | 1 hr | 1 hr | 1 hr | 1 hr |
|  | Step (5) | Liquid B System | | pure water micro contact angle | pure water micro contact angle | pure water micro contact angle | pure water micro contact angle |
| Evaluation results | Organic substance residue (SEM) | | | A | B | C | B |
|  | Contact angle [°] | Contact angle (i) in step (3) | | — | — | — | — |
|  |  | Contact angle (i) in step (3)' | | 83 | 70 | 59 | 70 |
|  |  | Contact angle (ii) in step (5) | | 95 | 87 | 89 | 87 |
|  | difference Δ in contact angle measurement values | | | 12 | 17 | 30 | 17 |

|  |  |  |  | Example 5 | Example 6 | Example 7 |
|---|---|---|---|---|---|---|
|  | Liquid repellent surface | | | liquid repellent surface A | liquid repellent surface A | liquid repellent surface A |
| Step | Step (2) | Development step | Liquid A1 System | xylene dipping | xylene dipping | xylene dipping |
|  |  | Rinse step | Liquid A1' System | xylene showering | xylene puddling | xylene puddling |
|  | Step (3) | Liquid B System | | — | — | — |
|  | Step (2)' | Full surface exposure (CE-9000) | | — | — | — |
|  |  | Development step | Liquid A2 System | methyl lactate dipping | methyl lactate dipping | methyl lactate dipping |
|  |  | Ultrasonic shaking | | 400 W, 1 hr | 400 W, 1 hr | 400 W, 1 hr |
|  |  | Rinse step | Liquid A2' System | isopropanol showering | ethanol showering | water showering |
|  | Step (3)' | Liquid B System | | pure water micro contact angle | pure water contact angle | pure water micro contact angle |
|  | Step (4) | Heating temperature | | 200° C. | 200° C. | 200° C. |
|  |  | Heating time | | 1 hr | 1 hr | 1 hr |
|  | Step (5) | Liquid B System | | pure water micro contact angle | pure water contact angle | pure water micro contact angle |
| Evaluation results | Organic substance residue (SEM) | | | B | B | C |
|  | Contact angle [°] | Contact angle (i) in step (3) | | — | — | — |
|  |  | Contact angle (i) in step (3)' | | 69 | 79 | 61 |
|  |  | Contact angle (ii) in step (5) | | 87 | 98 | 89 |
|  | difference Δ in contact angle measurement values | | | 18 | 19 | 28 |

TABLE 3

|  |  |  |  | Example 8 | Example 9 | Example 10 | Example 11 |
|---|---|---|---|---|---|---|---|
| Liquid repellent surface | | | | liquid repellent surface A | liquid repellent surface B | liquid repellent surface A | liquid repellent surface A |
| Step | Step (2) | Development step | Liquid A1 System | xylene dipping | xylene dipping | xylene dipping | xylene dipping |
|  |  | Rinse step | Liquid A1' System | xylene puddling | xylene puddling | xylene showering | xylene showering |
|  | Step (3) | Liquid B System | | — | — | — | pure water micro contact angle |
|  | Step (2)' | Full surface exposure (CE-9000) | | — | 27 J/cm$^2$ | 27 J/cm$^2$ | — |
|  |  | Development step | Liquid A2 System | methyl lactate dipping | methyl lactate dipping | methyl lactate dipping | — |
|  |  | Ultrasonic shaking | | 400 W, 1 hr | 400 W, 1 hr | 400 W, 1 hr | — |
|  |  | Rinse step | Liquid A2' System | methyl lactate showering | methyl lactate showering | methyl lactate showering | — |
|  | Step (3)' | Liquid B System | | ethanol micro contact angle | pure water micro contact angle | pure water micro contact angle | — |
|  | Step (4) | Heating temperature | | 200° C. | 200° C. | 100° C. | 140° C. |
|  |  | Heating time | | 1 hr | 1 hr | 1 hr | 1 hr |

TABLE 3-continued

|  |  |  |  | | | | |
|---|---|---|---|---|---|---|---|
| | Step (5) | Liquid B System | | ethanol micro contact angle | pure water micro contact angle | pure water micro contact angle | pure water micro contact angle |
| Evaluation results | Organic substance residue (SEM) | | | B | B | B | B |
| | Contact angle [°] | Contact angle (i) in step (3) | | — | — | — | 73 |
| | | Contact angle (i) in step (3)' | | 32 | 72 | 70 | — |
| | | Contact angle (ii) in step (5) | | 65 | 91 | 84 | 91 |
| | difference Δ in contact angle measurement values | | | 33 | 19 | 14 | 18 |

| | | | | Comparative Example 1 | Comparative Example 2 | Comparative Example 3 |
|---|---|---|---|---|---|---|
| | Liquid repellent surface | | | liquid repellent surface A | liquid repellent surface A | liquid repellent surface A |
| Step | Step (2) | Development step | Liquid A1 System | xylene dipping | xylene dipping | xylene dipping |
| | | Rinse step | Liquid A1' System | xylene showering | xylene showering | xylene puddling |
| | Step (3) | Liquid B System | | — | — | — |
| | Step (2)' | Full surface exposure (CE-9000) | | 27 J/cm$^2$ | — | — |
| | | Development step | Liquid A2 System | methyl lactate dipping | methyl lactate dipping | methyl lactate dipping |
| | | | Ultrasonic shaking | 400 W, 1 hr | 400 W, 1 hr | — |
| | | Rinse step | Liquid A2' System | methyl lactate showering | methyl lactate showering | methyl lactate showering |
| | Step (3)' | Liquid B System | | — | — | — |
| | Step (4) | Heating temperature Heating time | | 200° C. 1 hr | 200° C. 1 hr | 200° C. 1 hr |
| | Step (5) | Liquid B System | | pure water micro contact angle | pure water micro contact angle | pure water micro contact angle |
| Evaluation results | Organic substance residue (SEM) | | | A | B | C |
| | Contact angle [°] | Contact angle (i) in step (3) | | — | — | — |
| | | Contact angle (i) in step (3)' | | — | — | — |
| | | Contact angle (ii) in step (5) | | 95 | 93 | 89 |
| | difference Δ in contact angle measurement values | | | — | — | — |

As shown in Tables 2 and 3, in Examples 1 to 11, the difference Δ in contact angle measurement values was 14° to 33° when the evaluation result of organic residue was B and was 28° to 30° when the evaluation result of organic residue was C. Accordingly, the differences were clear, and the followability of the contact angle measurement value to the degree of organic residue was high. That is, it was demonstrated that the evaluation method of the present disclosure can detect an organic residue non-destructively and with high sensitivity.

In contrast, when the judgment was done based on only the contact angle (ii) obtained in Step (5) in Comparative Examples 1 to 3, as in a known method, the difference was 95°−93°=2° ((Comparative Example 1)−(Comparative Example 2)) when the evaluation result of organic residue was B and was 95°−89°=6° ((Comparative Example 1)−(Comparative Example 3)) when the evaluation result of organic residue was C. Accordingly, the differences were small, and the followability of the contact angle measurement value to the degree of organic residue was low. That is, it was demonstrated that the known evaluation method cannot detect an organic residue with high sensitivity.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230100, filed Nov. 28, 2016, which is hereby incorporated by reference herein in its entirety.

What is claimed is:

1. A method of detecting an organic residue on a surface of a base material, the method comprising:
   bringing a liquid A into contact with the surface of the base material;
   measuring a contact angle (i) of a liquid B on the surface with which the liquid A came into contact;
   heating and drying the base material;
   measuring a contact angle (ii) of the liquid B on the dried surface; and
   comparing the contact angle (i) with the contact angle (ii).

2. The method of detecting an organic residue according to claim 1, further comprising:
   forming an organic film on the surface of the base material before bringing a liquid A into contact with the surface of the base material,
   the organic film on the surface of the base material is removed by bringing the liquid A into contact with the surface of the base material in the liquid A-bringing step.

3. The method of detecting an organic residue according to claim 2, wherein the organic film comprises cyclized rubber resin.

4. The method of detecting an organic residue according to claim 2, wherein the organic film comprises a positive photosensitive resin.

5. The method of detecting an organic residue according to claim 1, wherein the liquid A is at least one of a polar organic solvent and water.

6. The method of detecting an organic residue according to claim 1, wherein the liquid A is at least one of an organic solvent having a hydroxyl group and water.

7. The method of detecting an organic residue according to claim 1, wherein when an organic residue is present on the surface of the base material, the organic residue is hydrophilized by bringing the liquid A into contact with the surface of the base material in the liquid A-bringing step.

8. The method of detecting an organic residue according to claim 1, wherein the surface of the base material is a liquid repellent surface.

9. The method of detecting an organic residue according to claim 8, wherein the surface of the base material has a contact angle of 75° or more with respect to the liquid B when no organic residue is present on the surface.

10. The method of detecting an organic residue according to claim 8, wherein the liquid repellent surface includes a cured material of a condensation product of hydrolytic silane compounds including a hydrolytic silane compound having 20 or more fluorine atoms.

11. The method of detecting an organic residue according to claim 1, wherein the base material is a silicon substrate.

12. The method of detecting an organic residue according to claim 1, wherein the liquid B is pure water.

13. The method of detecting an organic residue according to claim 1, wherein the contact angle (i) and the contact angle (ii) are measured with a micro contact angle meter.

14. The method of detecting an organic residue according to claim 1, the method further comprising:
exposing the surface of the base material to ultraviolet light after bringing the liquid A into contact with the surface of the base material and before measuring a contact angle (i) of the liquid B on the surface with which the liquid A came into contact.

15. The method of detecting an organic residue according to claim 1, wherein a value is calculated by subtracting the contact angle (i) from the contact angle (ii) in the comparing step.

16. The method of detecting an organic residue according to claim 15, wherein
the presence of an organic residue on the surface is recognized when the resulting value is equal to or higher than a predetermined value.

17. The method of detecting an organic residue according to claim 16, wherein
the presence of an organic residue on the surface is recognized when the resulting value is equal to or higher than 14°.

* * * * *